US008675051B2

(12) United States Patent
Sugimoto

(10) Patent No.: US 8,675,051 B2
(45) Date of Patent: Mar. 18, 2014

(54) IMAGE PROCESSING APPARATUS AND IMAGE PROCESSING METHOD

(75) Inventor: Kousei Sugimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 410 days.

(21) Appl. No.: 13/076,822

(22) Filed: Mar. 31, 2011

(65) Prior Publication Data

US 2011/0254930 A1 Oct. 20, 2011

(30) Foreign Application Priority Data

Apr. 14, 2010 (JP) .................................. 2010-093012

(51) Int. Cl.
*H04N 13/04* (2006.01)
*H04N 7/50* (2006.01)

(52) U.S. Cl.
USPC ............................................. 348/51; 375/240

(58) Field of Classification Search
USPC .......................................................... 348/51
See application file for complete search history.

(56) References Cited

U.S. PATENT DOCUMENTS

| 8,395,709 B2 * | 3/2013 | Hong et al. ................... 348/699 |
| 2007/0140347 A1 * | 6/2007 | Moon et al. ............... 375/240.16 |

FOREIGN PATENT DOCUMENTS

| CN | 1520180 A | 8/2004 | |
| CN | 1885953 A | 12/2006 | |
| CN | 101420606 A | 4/2009 | |
| CN | 101589614 A | 11/2009 | |
| CN | 101601304 A | 12/2009 | |
| JP | 03-263989 | 11/1991 | |
| JP | 2009-003507 | 1/2009 | |
| JP | 2009-003507 A | 1/2009 | |
| WO | WO2007063465 | * 11/2006 | ............... H04N 7/26 |
| WO | WO2007063465 A2 | * 11/2006 | ............... H04N 7/26 |

OTHER PUBLICATIONS

The above foreign patent documents were cited in a Jun. 3, 2013 Chinese Office Action, which is enclosed with an English Translation, that issued in Chinese Patent Application No. 201110095614.9.

* cited by examiner

*Primary Examiner* — Sath V Perungavoor
*Assistant Examiner* — Howard D Brown, Jr.
(74) *Attorney, Agent, or Firm* — Cowan, Liebowitz & Latman, P.C.

(57) ABSTRACT

An image processing apparatus includes: a unit that detects a motion vector from a first video image and a second video image; a unit that detects a disparity vector between a frame of the first video image and a frame of the second video image; a unit that, when there exists a non-detection position at which no motion vector is detected in a frame of one video image, performs correction by detecting a corresponding position included in a frame of the other video image that corresponds to the non-detection position using the disparity vector, and setting a motion vector of the frame of the other video image at the corresponding position, to the non-detection position; and a unit that generates respective interpolation frames of the first video image and the second video image using the motion vector after correction.

14 Claims, 13 Drawing Sheets

F(n,L)

B(n,L)

F(n,R)

B(n,R)

F(n+1,L)    B(n+1,L)

F(n+1,R)    B(n+1,R)

AF(n',L)    B(n',L)

AF(n',R)    B(n',R)

IMAGE PROCESSING APPARATUS AND IMAGE PROCESSING METHOD

BACKGROUND OF THE INVENTION

1. Field of the Invention

The present invention relates to an image processing apparatus and an image processing method in which stereoscopic video is obtained by displaying a video image for right-eye and a video image for left-eye.

2. Description of the Related Art

The need for video production compatible with stereoscopic video is ever more pressing in the wake of the growing spread of stereoscopic video. In this context, frame rate conversion (hereafter, FRC), which involves increasing the number of frames, is an effective technique for improving the smoothness of a moving image, and for suppressing flicker. Hence, FRC has become necessary in stereoscopic video as well. In FRC, the number of frames is increased by generating interpolation frames between frames. Vector interpolation is a widely used method for generating interpolation frames. In vector interpolation, there is obtained a motion vector between two frames to be subjected to interpolation, and the pixel positions in the frames are displaced by ½ of the motion vector quantity, to generate thereby an interpolation frame (Japanese Patent Application Publication No. H3-263989). A method for generating interpolation frames in a multi-view video image, such as stereoscopic video, is disclosed in, for instance, Japanese Patent Application Publication No. 2009-3507.

SUMMARY OF THE INVENTION

In FRC of stereoscopic video, however, there are instances where, for a given subject, a motion vector is detected in a frame for one eye, but the motion vector fails to be detected in a frame for the other eye. Therefore, a correct stereoscopic image fails to be displayed in the interpolation frame generated by vector interpolation just in the frame for one eye, and thus the stereoscopic sensation is lost, which is problematic. The technology disclosed in Japanese Patent Application Publication No. 2009-3507 does not solve this problem.

The present invention provides a technology for allowing generating interpolation frames in which the stereoscopic sensation is not lost, even when the motion vector in a frame for one eye fails to be detected, in frame rate conversion of stereoscopic video.

A first aspect of the present invention is an image processing apparatus that generates interpolation frames between respective frames of a first video image and a second video image that constitute stereoscopic video, the image processing apparatus comprising:

a motion vector detection unit that detects a motion vector between frames of each video image using two temporally consecutive frames that constitute the first video image and two temporally consecutive frames that constitute the second video image;

a disparity vector detection unit that, using a frame that constitutes the first video image and a frame that constitutes the second video image, detects a disparity vector that represents disparity between the two frames;

a correction unit that, when there exists a non-detection position at which no motion vector is detected in a frame of one video image from among the first video image and the second video image, performs correction by detecting a corresponding position included in a frame of the other video image that corresponds to the non-detection position using the disparity vector, and setting a motion vector of the frame of the other video image at the corresponding position, to the non-detect ion position; and an interpolation frame generation unit that generates respective interpolation frames of the first video image and the second video image using the motion vector after correction.

A second aspect of the present invention is an image processing apparatus that generates interpolation frames between respective frames of a first video image and a second video image that constitute stereoscopic video, the image processing apparatus comprising:

a motion vector detection unit that detects a motion vector between frames of each video image using two temporally consecutive frames that constitute the first video image and two temporally consecutive frames that constitute the second video image;

a disparity vector detection unit that, using a frame that constitutes the first video image and a frame that constitutes the second video image, detects a disparity vector that represents disparity between the two frames;

a correction unit that, when there exists a non-detection position at which no motion vector is detected in a frame of one video image from among the first video image and the second video image, performs correction by setting a zero-magnitude mot ion vector to the non-detection position, detecting a corresponding position included in a frame of the other video image that corresponds to the non-detection position using the disparity vector, and replacing a motion vector detected at the corresponding position by the zero-magnitude vector;

an interpolation frame generation unit that generates respective interpolation frames of the first video image and the second video image using the motion vector after correction.

A third aspect of the present invention is an image processing method, being a method executed by an image processing apparatus that generates interpolation frames between respective frames of a first video image and a second video image that constitute stereoscopic video, the method comprising the steps of:

detecting a motion vector between frames of each video image using two temporally consecutive frames that constitute the first video image and two temporally consecutive frames that constitute the second video image;

detecting, using a frame that constitutes the first video image and a frame that constitutes the second video image, a disparity vector that represents disparity between the two frames;

when there exists a non-detection position at which no motion vector is detected in a frame of one video image from among the first video image and the second video image, performing correction by detecting a corresponding position included in a frame of the other video image that corresponds to the non-detection position using the disparity vector, and setting a motion vector of the frame of the other video image at the corresponding position, to the non-detection position; and generating respective interpolation frames of the first video image and the second video image using the motion vector after correction.

A fourth aspect of the present invention is an image processing method, being a method executed by an image processing apparatus that generates interpolation frames between respective frames of a first video image and a second video image that constitute stereoscopic video, the method comprising the steps of:

detecting a motion vector between frames of each video image using two temporally consecutive frames that constitute the first video image and two temporally consecutive frames that constitute the second video image; detecting, using a frame that constitutes the first video image and a frame that constitutes the second video image, a disparity vector that represents disparity between the two frames;

when there exists a non-detection position at which no motion vector is detected in a frame of one video image from among the first video image and the second video image, performing correction by setting a zero-magnitude motion vector to the non-detection position, detecting a corresponding position included in a frame of the other video image that corresponds to the non-detection position using the disparity vector, and replacing a motion vector detected at the corresponding position by the zero-magnitude vector; and generating respective interpolation frames of the first video image and the second video image using the motion vector after correction.

The present invention allows generating interpolation frames in which the stereoscopic sensation is not lost, even when the motion vector in a frame for one eye fails to be detected, in frame rate conversion of stereoscopic video.

Further features of the present invention will become apparent from the following description of exemplary embodiments with reference to the attached drawings.

DESCRIPTION OF THE EMBODIMENTS

Embodiment 1

An image processing apparatus according to Embodiment 1 of the present invention, and an image processing method executed using the image processing apparatus, are explained next with reference to accompanying drawings. The image processing apparatus of the present embodiment generates interpolation frames between frames of a first video image and of a second video image that constitute stereoscopic video.

(Overall Configuration)

Figure 1:
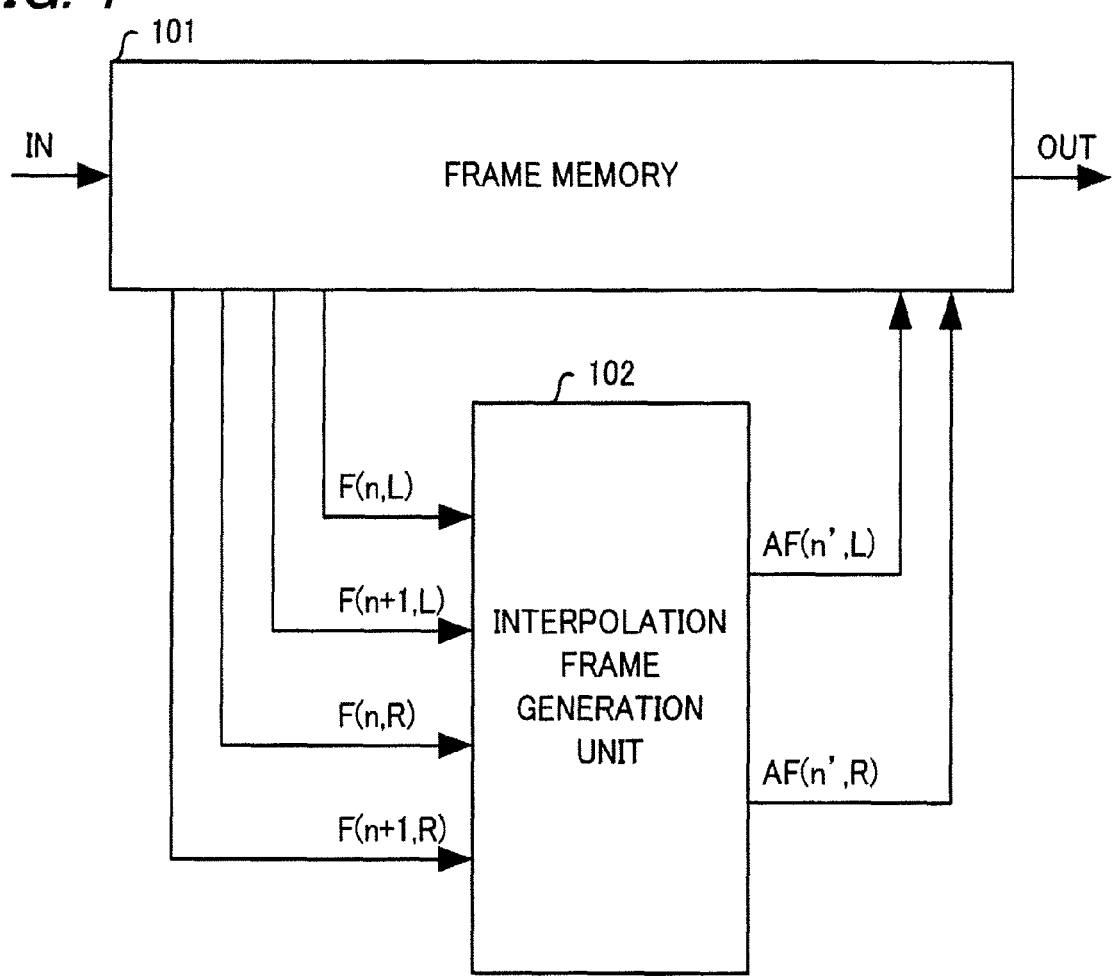
FIG. 1 is a block diagram illustrating an example of a functional configuration of an image processing apparatus according to the present invention.

Firstly, the overall configuration of the image processing apparatus according to Embodiment 1 will be explained first. FIG. 1 is a block diagram illustrating the functional configuration of an image processing apparatus according to Embodiment 1. As illustrated in FIG. 1, the image processing apparatus according to Embodiment has a frame memory 101 and an interpolation frame generation unit 102. In the present embodiment, the frames of a video image (input video image signal) inputted to the image processing apparatus are notated as F(n,p), and the interpolation frames interpolated between frames of the input video image signal are notated as AF(n', p). The video images inputted to an image display apparatus are a first video image (for instance, video image for right-eye) and a second video image (for instance, video image for left-eye) that constitute the stereoscopic image. Herein, n denotes the frame number, and p denotes the eye of the video image to which the frame belongs. A case where p=L indicates that the frame is a frame of a video image for left-eye, and p=R indicates at the frame is a frame of a video image for right-eye. An interpolation frame AF(n', p) denotes an in interpolation frame that is interpolated between an n-th frame and an (n+1)-th frame.

Figure 2:
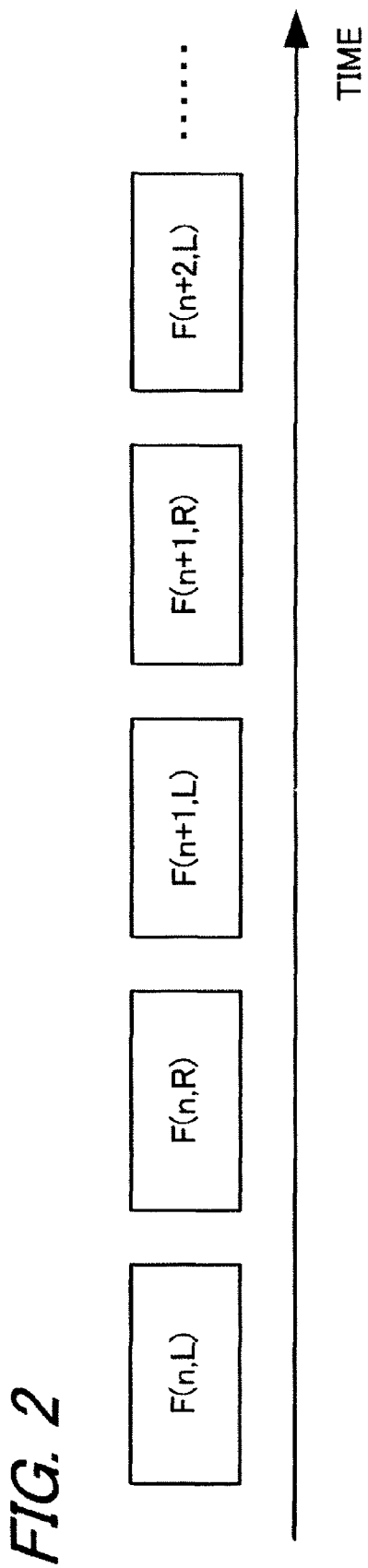
FIG. 2 is a diagram illustrating an example of a input video image signal.

An input video image signal is inputted, from IN, to the frame memory 101. In the input video image signal, as illustrated in FIG. 2, left-eye frames and right-eye frames are alternately arranged in a time direction (frame sequential scheme).

The frame memory 101 stores the input video image signal frame by frame. The frame memory 101 stores frames F(n,L), F(n+1,L), F(n,R), F(n+1,R), and inputs the frames to the interpolation frame generation unit 102.

The interpolation frame generation unit 102 generates interpolation frames AF(n',L), AF(n',R) from frames F(n,L), F(n+1,L), F(n,R), F(n+1,R). The method for generating interpolation frames is described below. The generated interpolation frames AF(n',L), AF(n',R) are inputted to the frame memory 101.

Figure 3:
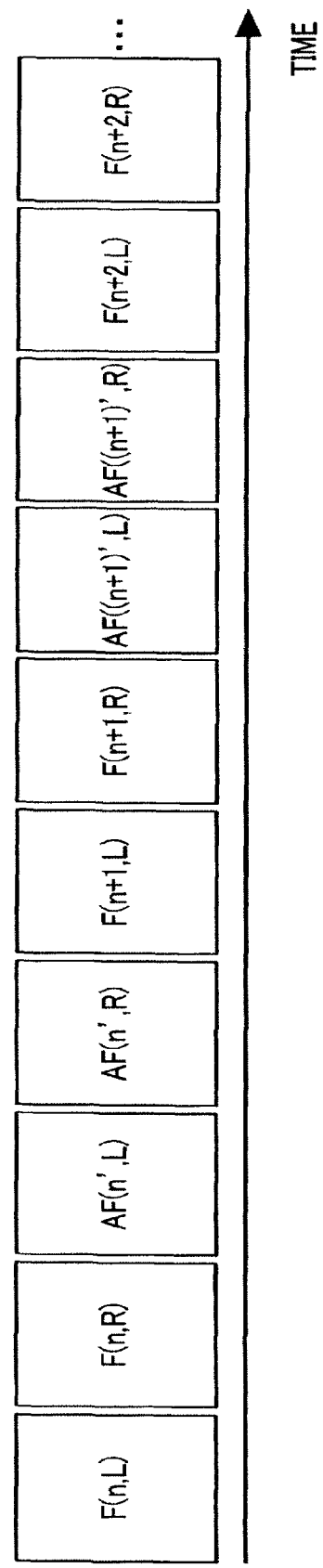
FIG. 3 is a diagram illustrating an example of a output video image signal.

The frame memory 101 stores the inputted interpolation frames AF(n',L), AF(n',R). As illustrated in FIG. 3, the frame memory 101 outputs an output video image signal in which interpolation frames are inserted between the frames of the input video image signal.

(Detailed Explanation of the Interpolation Frame Generation Unit)

The interpolation frame generation unit 102 of Embodiment 1 is explained in detail next.

Figure 4:
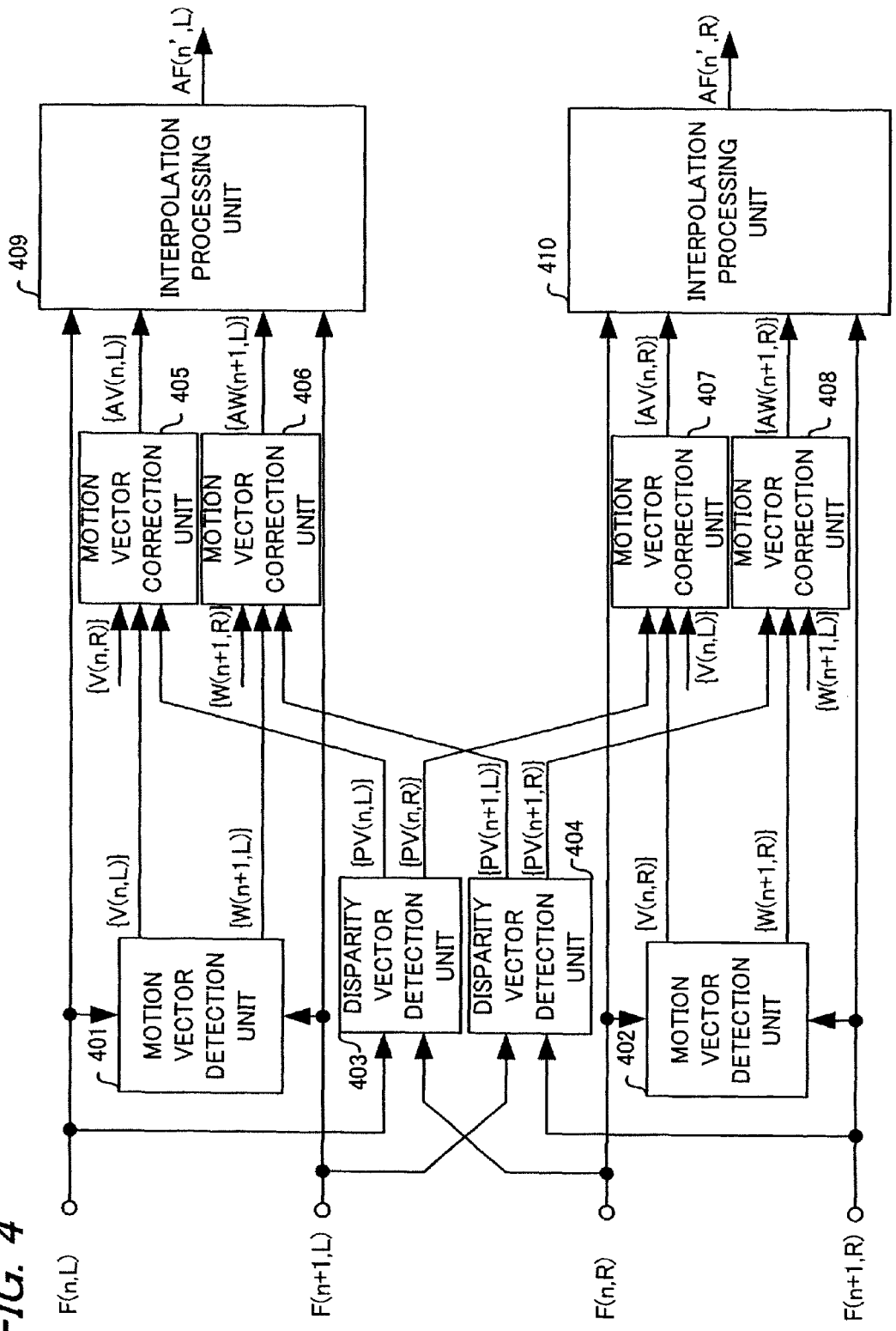
FIG. 4 is a block diagram illustrating an example of the functional configuration of an interpolation frame generation unit according to Embodiment 1.

FIG. 4 is a block diagram illustrating the functional configuration of the interpolation frame generation unit 102. As illustrated in FIG. 4, the interpolation frame generation unit 102 has motion vector detection units 401, 402, disparity vector detection units 403, 404, motion vector correction units 405, 406, 407, 408 and interpolation processing units 409, 410.

In the present embodiment, motion vectors that represent motion in the video image are notated as {V(n,p)} and {W(n, p)}, disparity vectors that represent the disparity between a video image for right-eye and a video image for left-eye is notated as {PV(n,p)}, and the motion vectors after correction are notated as {AV(n,p)} and {AW(n,p)}. In the present embodiment, each frame is divided into a plurality of division regions, and a motion vector and a disparity vector are detected for each division region. However the detection method of the motion vectors and the disparity vectors is not limited. For instance, the motion vector and the disparity vector may be detected for each pixel position. The vectors {V(n,p)}, {W(n,p)}, {PV(n,p)}, {AV(n,p)}, {AW(n,p)} include all the vectors, for each block, as detected by dividing the n-th frame for the p eye into a plurality of blocks. The method for detecting the vector for each block is described further on. For an arbitrary block blk, the vectors are notated as V(n,p, blk), W(n,p, blk), PV(n,p, blk), AV(n,p, blk), AW(n, p, blk).

The motion vector detection units 401, 402 detect respective motion vectors from the frames of the first video image and the second video image. In the present embodiment, there are used two frames A, B consecutive in time, such that motion vectors are detected in the form of a vector from a position in frame A up to a corresponding position in frame B, and a vector from a position in frame B up to a corresponding position in frame A.

The motion vector detection unit 401 detects motion vectors {V(n,L)}, {W(n+1,L)} from frame F(n,L) and frame F(n+1,L).

Figure 5:
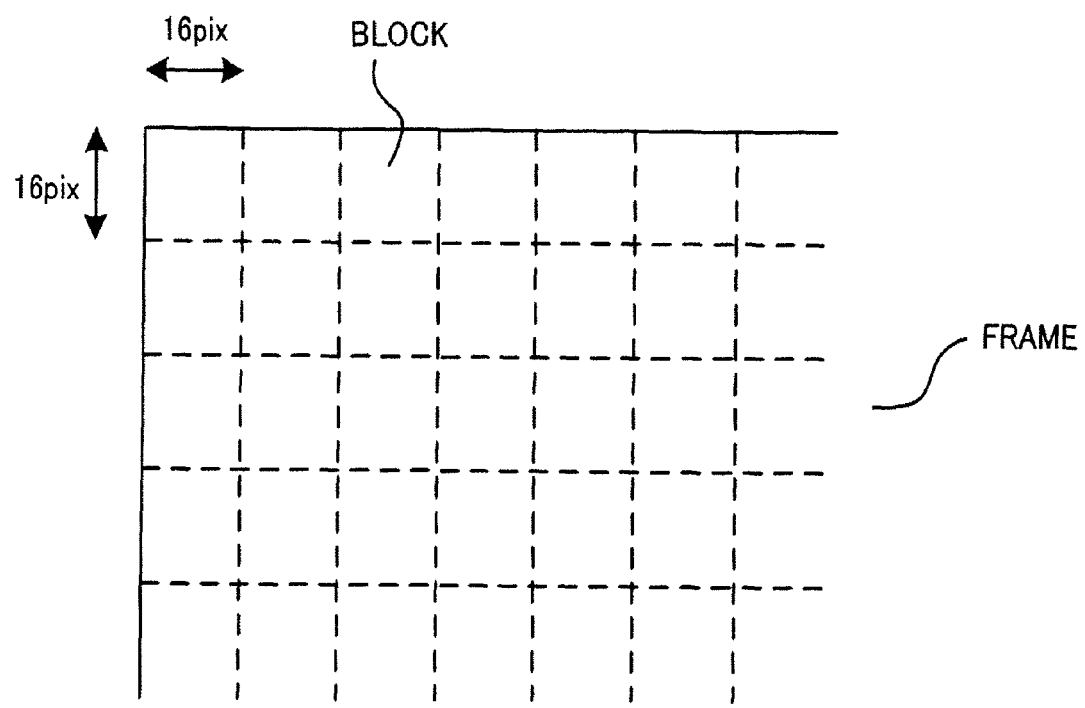
FIG. 5 is a diagram illustrating an example of block division.
Figure 6:
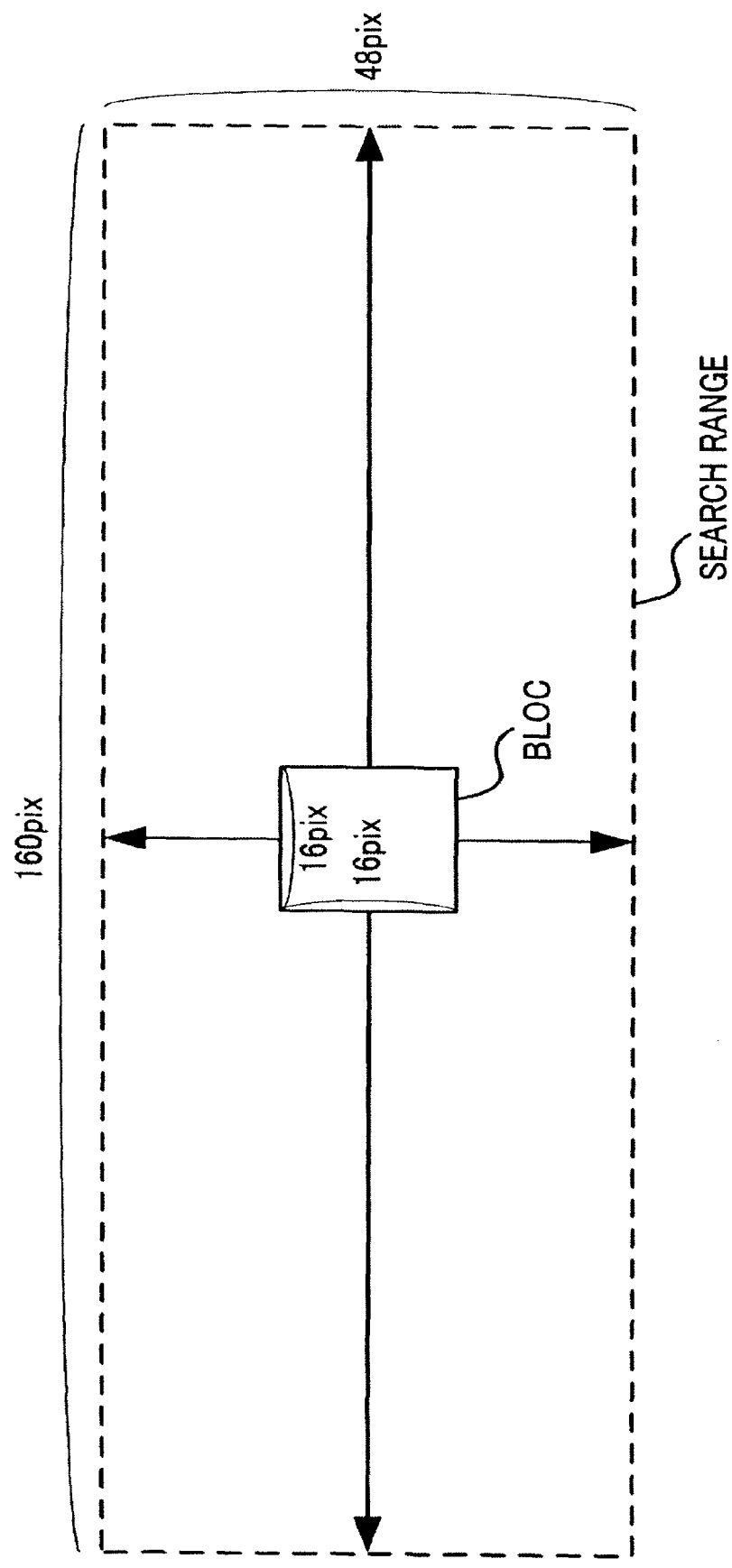
FIG. 6 is a diagram illustrating an example of a search range.

Specifically, as illustrated in FIG. 5, an n-th frame is divided into a plurality of blocks. In the present embodiment, the size of one block is 16 pixels*16 pixels (number of pixels in the vertical direction and number of pixels in the horizontal direction). Next, there is searched, for each block, the position of a region at which the sum of absolute differences (SAD) with pixel values in the block is minimal, from the (n+1)-th frame. For instance, the above-described position is searched, for each block, in the (n+1)-th frame, by moving, pixel by pixel, a selected region (region of size identical to that of the block), within a predetermined range (search range) referred to the same position as that of the block. In the present embodiment the search range is 160 pixels*48 pixels (FIG. 6). If the SAD at the searched position is smaller than a threshold value set beforehand, the difference between the searched position and the block position (vector from the block position up to the searched position) is taken as the motion vector of the block. If the SAD is equal to or greater than the threshold value, then "no motion vector" is determined for that block. The block position may be any position, for instance a central position of the block, so long as the position in the block can be specified by the block position.

The above process is carried out for all blocks in the n-th frame, to detect the motion vector of each block, which is notated as V(n,L).

Similarly, the motion vector detection unit 401 divides the (n+1)-th frame into a plurality of blocks, searches the position of a region at which the SAD is minimum, from the n-th frame, for each block, and detects the motion vector of each block, which is notated as W(n+1,L).

The motion vector detection unit 402 detects motion vectors {V(n,R)}, {W(n+1,R)} from frames F(n,R), F(n+1, R) by carrying out the same process as that of the motion vector detection unit 401.

The disparity vector detection unit 403 detects disparity vectors that represent the disparity between frames, from frames F(n,L), F(n,R). The disparity vectors, like the motion vectors, are detected by block matching method.

Specifically, a frame F(n,L) is divided into a plurality of blocks (blocks having a size of 16 pixels*16 pixels), and there is searched the position of a region at which the SAD with the pixel value in each block is minimum, from frame F(n,R). The disparity vector has fundamentally no vertical direction component, and hence the search range may extend just in the horizontal direction (for instance, over 160 pixels*16 pixels). A threshold value is provided, as in the case of the motion vectors, such that if the SAD at the searched position is smaller than the threshold value, the difference between the searched position and the block position is taken as the disparity vector of that block, and if the SAD is greater than or equal to the threshold value, "no disparity vector" is determined for that block.

This process is carried out for all the blocks, to detect the disparity vector for each block. This is notated as PV(n,L).

Similarly, the disparity vector detection unit 403 divides frame F(n,R) into a plurality of blocks, searches the position of a region at which the SAD is minimum, from frame F(n,L), for each block, and detects the disparity vector for each block, which is notated as PV(n,R).

The disparity vector detection unit 404 performs the same process as that of the disparity vector detection unit 403, to detect the disparity vectors {PV(n+1,L)}, {PV(n+1,R)} between (n+1)-th right- and left-eye frames, from frames F(n+1,L), F(n+1,R).

In the present embodiment, the size of the blocks in the motion vector detection units 401, 402 is identical to the size of the blocks in the disparity vector detection units 403, 404, but the block sizes may be dissimilar. For instance, the block size in the motion vector detection units 401, 402 may be 8 pixels*8 pixels, and the block size in the disparity vector detection units 403, 404 may be 16 pixels 16 pixels. The threshold values for determining the presence or absence of motion vectors and the presence or absence of disparity vectors may be mutually identical or dissimilar.

If there exists a non-detection position at which no motion vector is detected in a video image frame in either the first video image or the second video image, then the motion vector correction units 405 to 408 detect a corresponding position for the non-detection position, using the disparity vector, from the frame of the other video image. Next, the motion vector correction units 405 to 408 perform a correction that involves setting a motion vector detected at the corresponding position to the non-detection position. The motion vector correction units 405 to 408 correspond to the correction unit of the present invention.

The motion vector correction unit 405 corrects the motion vectors of blocks determined as "no motion vector", for the motion vectors {V(n,L)} detected by the motion vector detection unit 401. Specifically, the motion vector of a block blk1 determined as "no motion vector" of frame F(n,L) is replaced by the motion vector of a block blk2 of frame F(n,R) corresponding to (having the same data) as the block. That is, motion vector V(n,L,blk1) is replaced by motion vector V(n, R, blk2).

In a more detailed explanation, a disparity exists between frame F(n,L) and frame F(n,R), and hence a same object does not necessarily occupy a same position. Accordingly, there is worked out which block, within frame F(n,R), the block of frame F(n,L) corresponds to, using the disparity vectors {PV(n,L)} detected by the disparity vector detection unit 403. In frame F(n,R), specifically, block blk2 at the position displaced by disparity vector PV(n,L,blk1) from the position of block blk1 in frame F(n,L), constitutes a block that corresponds to block blk1.

In a case where a destination position does not match fully the block position of frame F(n,R) (i.e. in a case where a region having the same size as that of a block referred to the destination position straddles a plurality of blocks), a motion vector is calculated in accordance with the destination position. Specifically, the motion vector of the corresponding block is obtained by adding values obtained by multiplying the motion vectors of each block straddled by the region referred to the destination position by the ratio of surface area overlapped by the region of each block to the size of the block.

The motion vector correction unit 405 allocates a 0 vector (vector of 0 magnitude) to blocks having neither motion vector nor disparity vector.

The motion vectors of the block for which "no motion vector" has been determined is corrected, and the motion vectors {V(n,L)} are taken as the motion vectors {AV(n,L)}. The motion vectors {AV(n,L)} are supplemented with an information "corrected", for motion vectors replaced with the motion vector acquired from the motion vectors {V(n,R)}, and "not corrected" for a motion vector in which no such replacement has been performed.

Similarly to the motion vector correction unit 405, the motion vector correction unit 406 corrects the motion vector of a block for which "no motion vector" has been determined for the motion vectors {W(n+1,L)} detected by the motion vector detection unit 401. The motion vectors {W(n+1,L)} become the motion vectors {AW(n+1,L)}.

Similarly to the motion vector correction unit 405, the motion vector correction unit 407 corrects the motion vector of a block for which "no motion vector" has been determined for the motion vectors {V(n,R)} detected by the motion vector detection unit 402. The motion vectors {V(n,R)} become the motion vectors {AV(n,R)}.

Similarly to the motion vector correction unit 405, the motion vector correction unit 408 corrects the motion vector of a block for which "no motion vector" has been determined for the motion vectors {W(n+1,R)} detected by the motion vector detection unit 402. The motion vectors {W(n+1,R)} become the motion vectors {AW(n+1,R)}.

The interpolation processing units 409, 410 (interpolation frame generation unit) generate interpolation frames that are interpolated between respective frames of the first video image and the second video image, using the corrected motion vectors. In the present embodiment, each pixel in a frame (frames A, B) is mapped to the position in an interpolation frame, on the basis of a motion vector, after which there is generated each pixel of the interpolation frame using respective pixels mapped to each position in the interpolation frame. Pixels are generated for the interpolation frame position to which a plurality of pixels is mapped, using only pixels at a position for which motion vector detection results are corrected, from among the plurality of pixels.

The interpolation processing unit 409 generates an interpolation frame AF(n',L) using frames F(n,L), F(n+1,L) and the corrected motion vectors {AV(n,L)}, {AW(n+1,L)}.

In interpolation frame AF(n',L), specifically, there is generated a block blk (pixel group) of frame F(n,L) at a position displaced by ½ of the corresponding motion vector AV(n,L,blk), from the position of block blk. Similarly, in interpolation frame AF(n',L) there is generated a block blk of frame F(n+1,L) at a position displaced by ½ of the corresponding motion vector AW(n+1,L,blk) from the position of block blk. The average value of pixel values of overlapping blocks is calculated, pixel by pixel, at portions were generated blocks overlap, and the average is taken as the pixel value of interpolation frame AF(n',L) (averaging process). In a case where the overlapping blocks include blocks at a position at which the motion vector is corrected by the motion vector correction units 405 to 408, however, the above-described averaging process is not performed, and the pixel value of the block is given priority and is taken as the pixel value of interpolation frame AF(n',L). In case of overlap between blocks at a position at which the motion vector is corrected, there is calculated, pixel by pixel, the average value of the pixel value of the overlapping blocks, and the average is taken as the pixel value of interpolation frame AF(n',L).

In interpolation frame AF(n',L), the pixel value of a portion at which the blocks of frames F(n,L), F(n+1,L) have not been generated is the average value of the pixel values of frame F(n+1,L) and frame F(n,L) at a position identical to that of a portion at which the blocks of frames F(n,L), F(n+1,L) have not been generated.

Like the interpolation processing unit 409, the interpolation processing unit 410 generates interpolation frame AF(n', R) using frames F(n,R), F(n+1,R) and the corrected motion vectors {AV(n,R)}, {AW(n+1,R)}.

Interpolation frames are generated thus in Embodiment 1 as described above.

(Detailed Explanation of the Interpolation Frame Generation Unit)

The operation of the interpolation frame generation unit 102 of Embodiment 1 is explained in detail next.

Figure 7A:
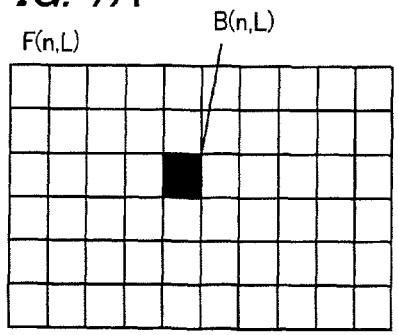
FIGS. 7A to 7F are diagrams illustrating an example of a conventional interpolation frame generation method.
Figure 7B:
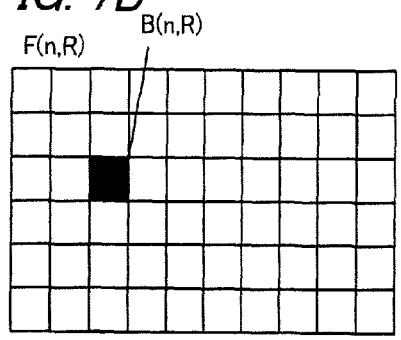
Figure 7C:
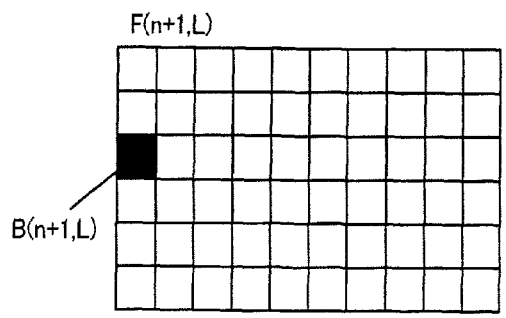
Figure 7D:
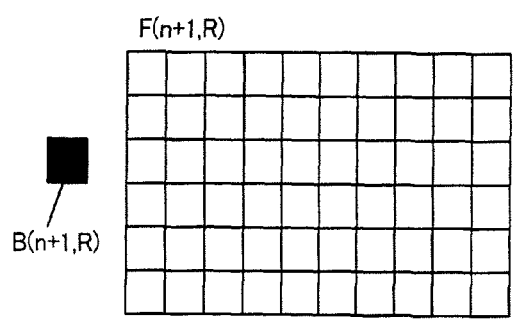
Figure 7E:
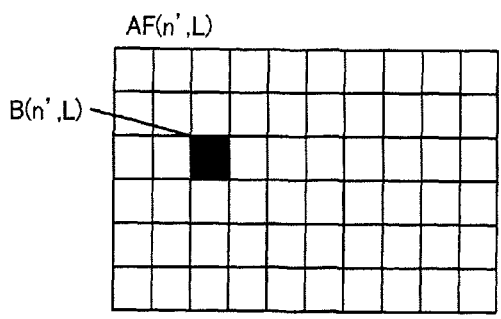
Figure 7F:
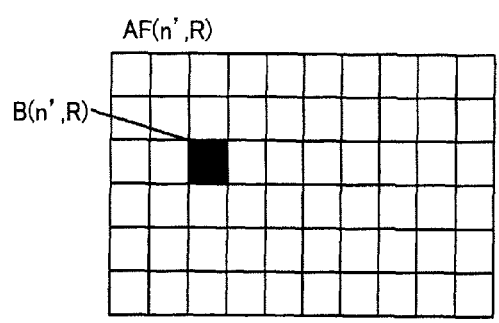
Figure 8A:
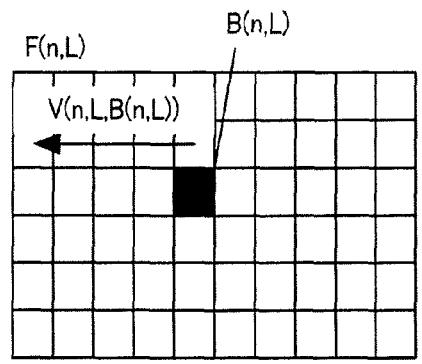
FIGS. 8A to 8F are diagrams illustrating an example of an interpolation frame generation method according to Embodiment 1.
Figure 8B:
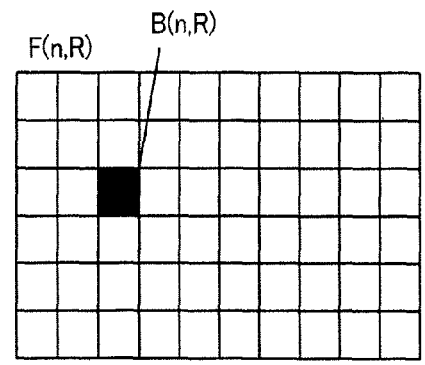
Figure 8C:
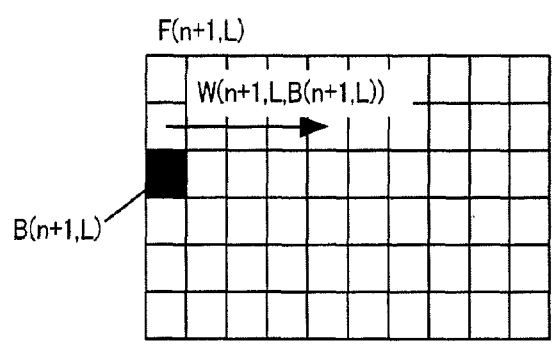
Figure 8D:
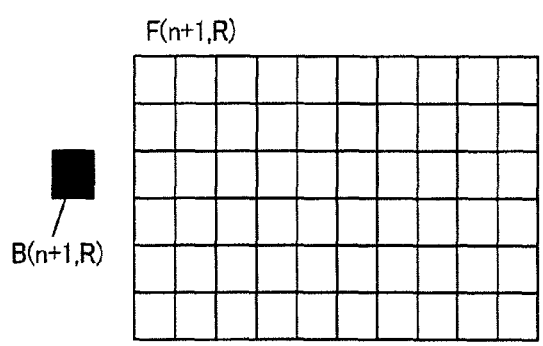
Figure 8E:
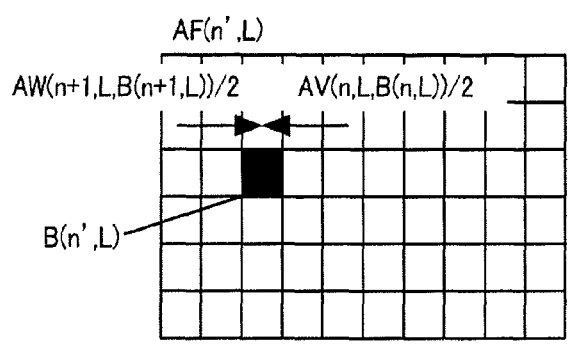
Figure 8F:
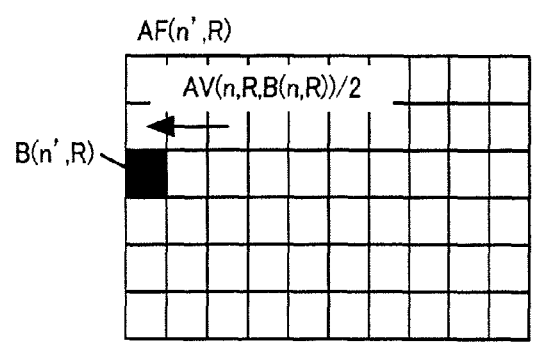
Figure 9A:
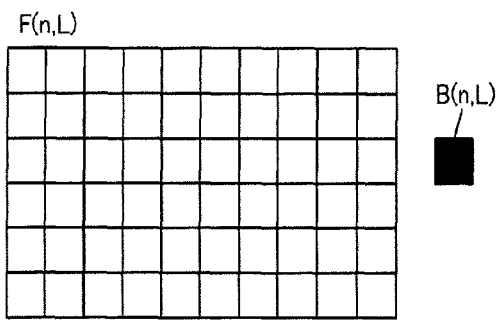
FIGS. 9A to 9F are diagrams illustrating an example of a conventional interpolation frame generation method.
Figure 9B:
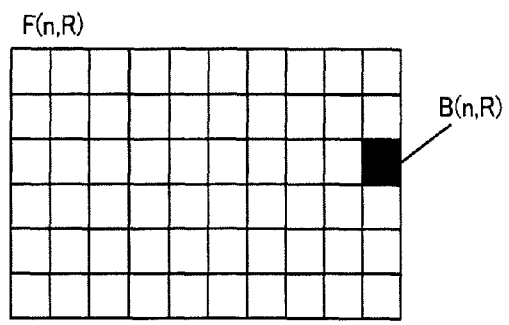
Figure 9C:
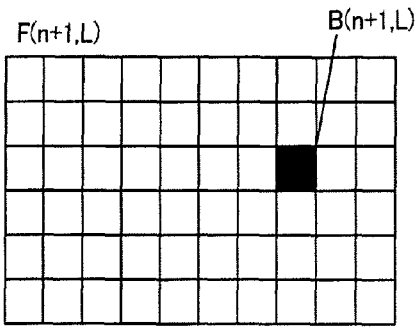
Figure 9D:
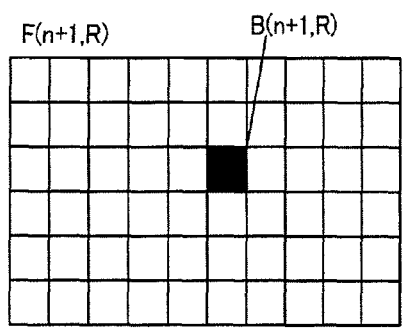
Figure 9E:
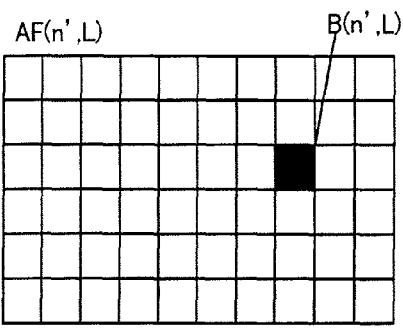
Figure 9F:
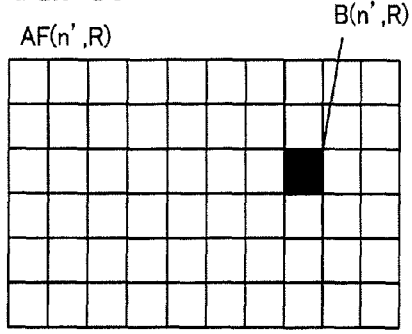
Figure 10A:
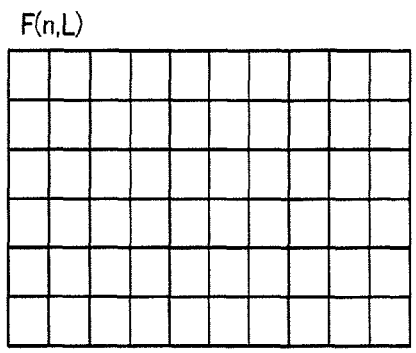
FIGS. 10A to 10F are diagrams illustrating an example of an interpolation frame generation method according to Embodiment 1.
Figure 10B:
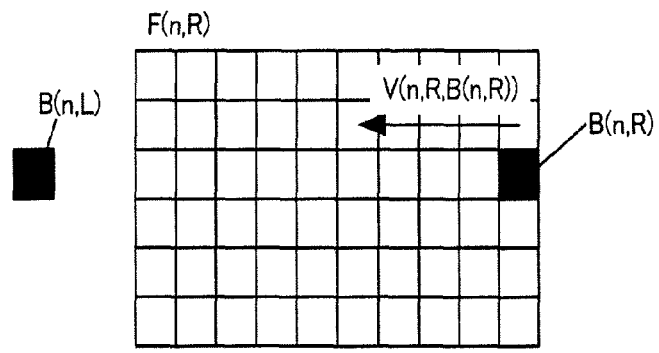
Figure 10C:
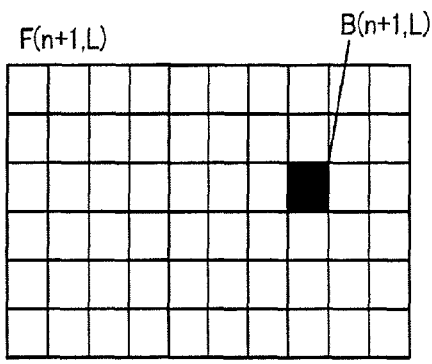
Figure 10D:
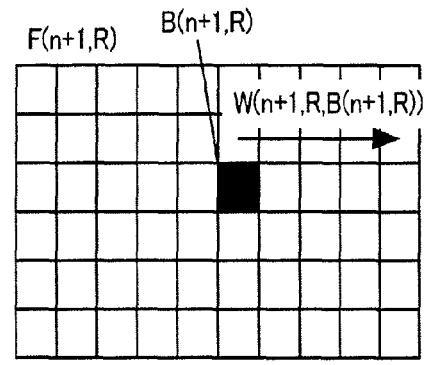
Figure 10E:
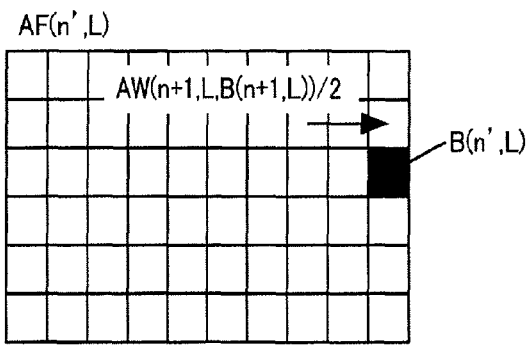
Figure 10F:
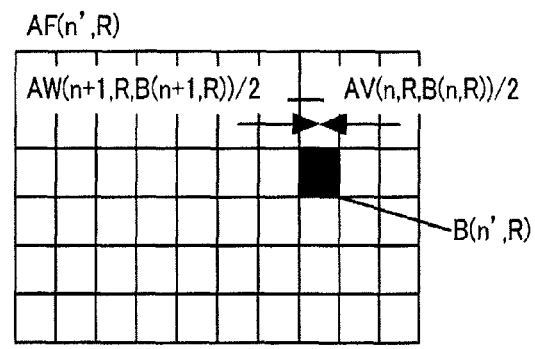

FIGS. 7A to 7F, 8A to 8F are diagrams for explaining the operation of the interpolation frame generation unit 102 in an instance of frame-out, where a black square object (hereafter, simply "object") moves from the right to the left against a white background. FIGS. 7A to 7D, 8A to 8D represent input video image signal frames, while FIGS. 7E, 7F, 8E, 8F represent interpolation frames. Specifically, FIGS. 7A, 8A represent frame F(n,L), FIGS. 7B, 8B represent frame F(n,R), FIGS. 7C, 8C represent frame F(n+1,L), FIGS. 7D, 8D represent frame F(n+1,R), FIGS. 7E, 8E represent interpolation frame AF(n',L) and FIGS. 7F, 8F represent interpolation frame AF(n',R). To simplify the explanation, each frame is divided into 10*6 blocks, such that the size of the object is exactly the same as the size of one block. The explanation of the operation focuses on a black square object. The block of the object is notated as B(n,p).

In FIGS. 7A to F, 8A to 8F, the object in block B(n,L) of frame F(n,L) and the object in block B(n,R) of frame F(n,R) correspond to each other, and have stereoscopic video disparity. Hence, objects are viewed as floating off the white background. The object moves to the left, and becomes positioned at block B(n+1,L) in frame F(n+1,L) subsequent to frame F(n,L). The object frames out in frame F(n+1,R). Specifically, the object becomes positioned at a block B(n+1,R) outside the frame, and is no longer included in the video image signal (frame).

A conventional operation will be explained first, with reference to FIGS. 7A to 7F, in order to clarify the difference vis-à-vis the operation according to the present embodiment (method for generating interpolation frames) and conventional operation.

In a conventional method, the motion vector of the object is detected between frame F(n,L) and frame F(n+1,L). Therefore, the object is generated at block B(n',L) in interpolation frame AF(n',L). However, no object is present in frame F(n+1,R), between frame F(n,R) and frame F(n+1,R). Therefore, the motion vector of the object is not detected, and vector interpolation cannot be performed. If, for instance, the 0 vector is used in a case where no motion vector is detected, then the object is generated at block B(n',R) at the same position as that of block B(n,R), in interpolation frame AF(n', R). In this case, the object is not generated at a position at which the object should have been generated. Therefore, the disparity of the object generated in block B(n',L) and block B(n',R) is inaccurate, and the stereoscopic sensation is lost. Continuity with preceding and succeeding frames is likewise lost. Also, in case that the generation position of other interpolation data, for instance white background data, overlaps the generation position of the object, the pixel value at the overlapping position is an average value of black and white pixel values. As a result, the black square object becomes a gray square object.

An explanation follows next, with reference to FIGS. 8A to 8F, on the operation according to the present embodiment. The present embodiment allows solving the above problems.

An object at block B(n,L) of frame F(n,L) is searched from frame F(n+1,L). Specifically, a region is searched at which the SAD with the pixel value in block B(n,L) is smallest, and at which the SAD is smaller than the threshold value, from frame F(n+1,L). As a result, the pixel value in block B(n,L) matches the pixel value in block B(n+1,L), and there is accordingly obtained motion vector V(n,L,B(n,L)). The object in block B(n+1,L) of frame F(n+1,L) is searched from frame F(n,L). As a result, the pixel value in block B(n+1,L) matches the pixel value in block B(n,L), and there is accordingly obtained motion vector W(n+1,L,B(n+1,L)).

Motion vector V(n,L,B(n,L)), W(n+1,L,B(n+1,L)) is acquired, and hence AV(n,L,B(n,L))=V(n,L,B(n,L)), AW(n+1,L,B(n+1,L))=W(n+1,L,B(n+1,L)). In interpolation frame AF(n',L), block B(n,L) is generated at a position displaced by ½ of motion vector AV(n,L,B(n,L)), from the block position. The block B(n+1,L) is generated at a position displaced by ½ of motion vector AW(n+1,L,B(n+1,L)) from the block position. The blocks B(n,L), B(n+1,L) generated at interpolation frame AF(n',L) overlap each other, and hence the average value of the pixel value in blocks B(n,L), B(n+1,L) is calculated pixel by pixel, to yield the pixel value in block B(n',L). Both blocks B(n,L), B(n+1,L) are blocks of the black square object, and hence the pixel value does not change even upon averaging (i.e. block B(n',L) is also a block of the black square object).

The object at block B(n,R) of frame F(n,R) is searched from frame F(n+1,R). As a result, there can be found no region that matches the pixel value in block B(n,R) (specifically, a region at which the SAD is smaller than the threshold value). Therefore, "no motion vector" is determined for block B(n,R). A minimum-SAD region is searched for each block in frame F(n+1,R), from frame F(n,R), and the motion vectors {W(n+1,R)} are detected. However, the black square object is absent in frame F(n+1,R), and hence the motion vectors {W(n+1,R)} include no motion vector relating to the black square object.

The disparity vectors {PV(n,L)}, {PV(n,R)} are detected between frames F(n,L), F(n,R). The block B(n,L) (block at which the motion vector is detected) corresponding to block B(n,R) for which "no motion vector" has been determined is detected using the disparity vectors {PV(n,R)}, from frame F(n,L). Motion vector V(n,L,B(n,L) of block B(n,L) is acquired as mot ion vector AV(n,R,B(n,R)). In interpolation frame AF(n',R), next, block B(n,R) is generated at a position displaced by ½ of motion vector AV(n,R,B(n,R)), from the block position of block B(n,R), i.e. is generated at the position of block B(n',R). In interpolation frame AF(n',R), block B(n, R) and another block (white background block) are in some cases generated overlapping each other. However, motion vector AV(n,R, B(n,R)) is a "corrected" motion vector, and hence the data (pixel value) of the black square object is given priority, without being subjected to averaging.

Generating interpolation frames in the above-described way allows generating a black square object at blocks B(n',L), B(n',R) at which correct disparity is maintained, and allows generating interpolation frames at which the stereoscopic sensation is not lost.

The operation of the interpolation frame generation unit 102 in a case of frame-in of a black square object moving from the right to the left on a white background will be explained next with reference to FIGS. 9A to 9F, 10A to 10F. Similarly to FIGS. 7A to 7F, 8A to 8F, FIGS. 9A to 9D, 10A to 10D represent frames of an input video image signal, and FIGS. 9E, 9F, 10E, 10F represent interpolation frames.

A conventional operation will be explained first with reference to FIGS. 9A to 9F. As illustrated in FIGS. 9A to 9F, frame F(n,L) contains no object. At frame F(n+1,L), the object frames in, and becomes positioned at block B(n+1,L). The object positioned at block B(n,R) in frame F(n,R) moves to the left, and becomes positioned at block B(n+1,R), in frame F(n+1,R).

In a conventional method, the motion vector of the object is detected between frame F(n,R) and frame F(n+1,R). Therefore, the object is generated at block B(n',R) in interpolation frame AF(n',R). However, the motion vector of the object is not detected between frame F(n,L) and frame F(n+1,L). In interpolation frame AF(n',L), as a result, the object is generated at block B(n',L), at a same position as that of block B(n+1,L). In this case as well, the object is not generated at a position at which the object should have been generated. As a result, the disparity of the object generated in block B(n',L) and block B(n',R) is inaccurate, and the stereoscopic sensation is lost. Continuity with preceding and succeeding frames is likewise lost. Also, in case that the generation position of other interpolation data, for instance white background data, overlaps the generation position of the object, the pixel value at the overlapping position is an average value of black and white pixel values. The black square object becomes a gray square object as a result.

An explanation follows next on the operation according to the present embodiment, with reference to FIGS. 10A to 10F.

The object at block B(n,R) of frame F(n,R) is searched from frame F(n+1,R). As a result, the pixel value in block B(n,R) matches the pixel value in block B(n+1,R), and there is accordingly obtained motion vector V(n,L,B(n,R)). The object in block B(n+1,R) of frame F(n+1,R) is searched from frame F(n,R). As a result, the pixel value in block B(n+1,R) matches the pixel value in block B(n,R), and there is accordingly obtained motion vector W(n+1, R, B(n+1,R)).

The motion vectors V(n,R, B(n,R)), W(n+1, R, B(n+1,R)) are acquired, and hence AV(n,R, B(n,R))=V(n,R, B(n,R)), and AW(n+1, R, B(n+1,R))=W(n+1, R, B(n+1,R)). In interpolation frame AF(n',R), block B(n,R) is generated at a position displaced by ½ of motion vector AV(n,R, B(n,R)), from the block position of block B(n,R). The block B(n+1,R) is generated at a position displaced by ½ of motion vector AW(n+1, R, B(n+1,R)), from the block position of block B(n+1,R). The blocks B(n,R), B(n+1,R) generated at interpolation frame AF(n',R) overlap each other, and hence the average value of the pixel value in blocks B(n,R), B(n+1,R) is calculated pixel by pixel, to yield the pixel value in block B(n',R). Both blocks B(n,R), B(n+1,R) are blocks of the black square object, and hence the pixel value does not change even upon averaging (i.e. block B(n',R) is also a block of the black square object).

A minimum-SAD region is searched for each block in frame F(n,L), from frame F(n+1,L), and the motion vectors {V(n,L)} are detected. However, the black square object is absent in frame F(n,L), and hence the motion vectors {V(n, L)} include no motion vector relating to the black square object. The object in block B(n+1,L) of frame F(n+1,L) is searched from frame F(n,L). As a result, there can be found no region that matches the pixel value in block B(n+1,L). Therefore "no motion vector" is determined for block B(n+1,L).

The disparity vectors {PV(n+1,L)}, {PV(n+1,R)} are detected between frames F(n+1,L), F(n+1,R). Thereupon there is detected block B(n+1,R) (block at which the motion vector is detected) corresponding to block B(n+1,L) for which "no motion vector" has been determined, from frame F(n+1,R), using the disparity vectors {PV(n+1,L)}. The motion vector W(n+1, R, B(n+1,R)) of block B(n+1,R) is acquired as motion vector AW(n+1,L,B(n+1,L)). In interpolation frame AF(n',L), next, block B(n+1,L) is generated at a position displaced by ½ of motion vector AW(n+1,L,B(n+1, L)), from the block position of block B(n+1,L), i.e. is generated at the position of block B(n', L). In interpolation frame AF(n',L), block B(n,R) and another block (white background block) are generated in some cases overlapping each other. However, motion vector AW(n+1,L,B(n+1,L)) is a "corrected" motion vector, and hence the data (pixel value) of the black square object is given priority, without being subjected to averaging.

Generating interpolation frames in the above-described way allows generating a black square object at blocks B(n',L), B(n',R) at which correct disparity is maintained, and allows generating interpolation frames at which the stereoscopic sensation is not lost.

In the present embodiment, thus, if a non-detection position of a motion vector is present in a frame for one eye, as described above, then a motion vector detected at a corresponding position that corresponds to the non-detection position, in the frame for the other eye, is set for the non-detection position. Correct disparity can be maintained, upon frame rate conversion of stereoscopic video, by generating an interpolation frame using the motion vector thus set. In the present embodiment, specifically, interpolation frames in which the stereoscopic sensation is not lost can be generated, even in a case where a motion vector cannot be detected in a frame for one eye.

In the present embodiment, pixels are generated, at a position of an interpolation frame to which a plurality of pixels is mapped, by using only pixels at a position for which a motion vector detection result has been corrected, from among the plurality of pixels. The stereoscopic sensation can be further maintained as a result while suppressing color changes in the subject.

Embodiment 2

An image processing apparatus according to Embodiment 2 of the present invention, and an image processing method executed using the image processing apparatus, are explained next with reference to accompanying drawings. In Embodiment 1, vector interpolation is carried out using a motion vector detected in a frame of the other eye, in a case where no motion vector is detected in a frame for one eye. In Embodiment 2, motion vectors of both frames are corrected, so as not to carry out vector interpolation, in a case where no motion vector is detected in a frame for one eye. Features and functions identical to those of Embodiment 1 will not be explained again.

(Overall Configuration)

The overall configuration of the image processing apparatus according to Embodiment 2 is the same as that of the image processing apparatus according to Embodiment 1, as illustrated in FIG. 1. The configuration of the interpolation frame generation unit 102 in the image processing apparatus according to Embodiment 2 is different from that in the image processing apparatus according to Embodiment 1.

(Detailed Explanation of the Interpolation Frames Generation Unit)

The interpolation frame generation unit 102 of Embodiment 2 is explained in detail next.

Figure 11:
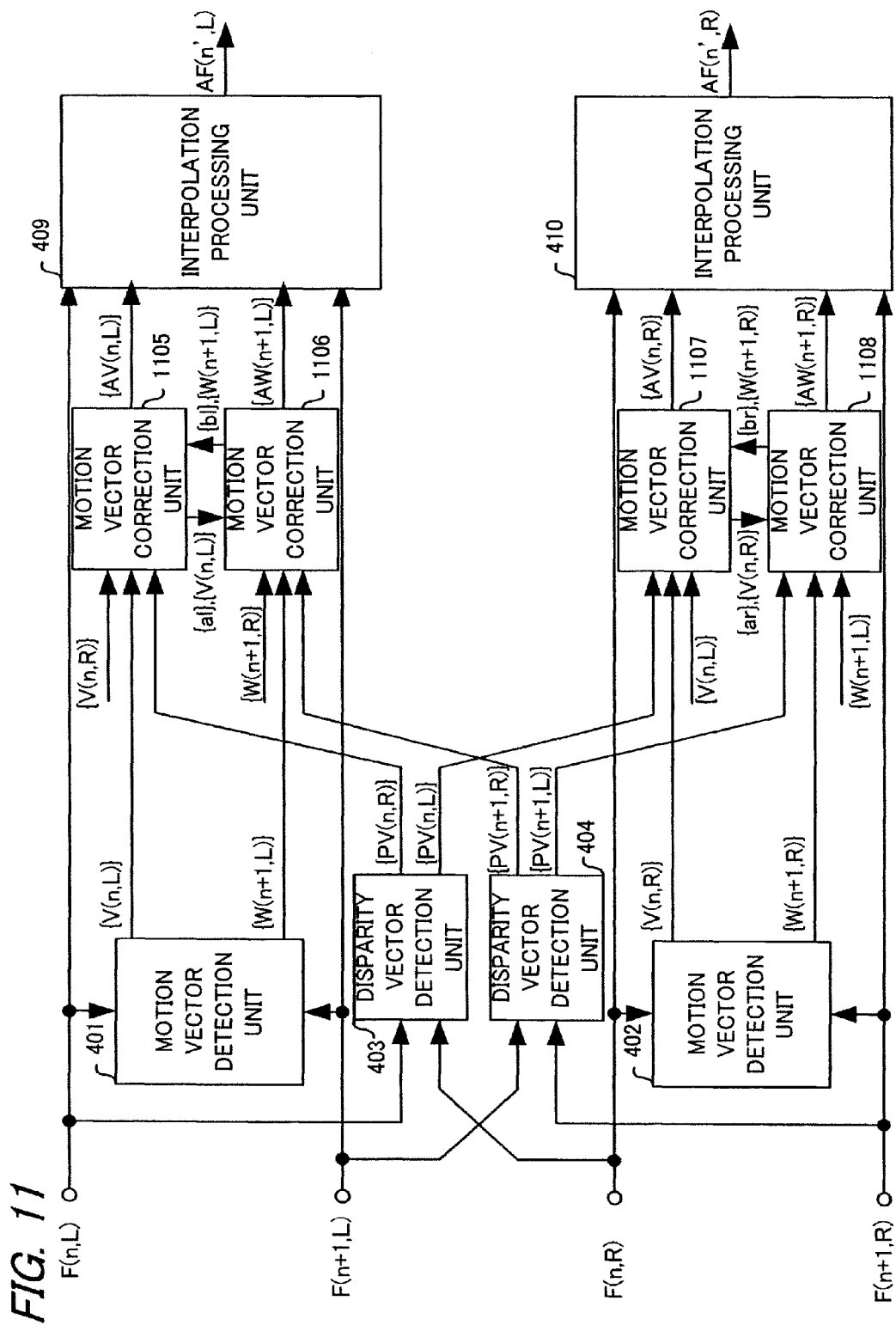
FIG. 11 is a block diagram illustrating an example of the functional configuration of an interpolation frame generation unit according to Embodiment 2.

FIG. 11 is a block diagram illustrating the functional configuration of the interpolation frame generation unit 102. The same functional blocks as in Embodiment 1 are denoted with the same reference numerals, and a recurrent explanation thereof will be omitted.

If there exists a non-detection position at which no motion vector is detected in a video image frame in either the first video image or the second video image, the motion vector correction units 1105 to 1108 detect a corresponding position that corresponds to the non-detection position, using the disparity vector, from the frame of the other video image. Correction is performed whereby a 0-magnitude motion vector (0 vector) is set for the aforementioned non-detection position, and a motion vector detected at the aforementioned corresponding position is replaced by the 0 vector. In the present embodiment, the motion vector correction units 1105 to 1108 correspond to a correction unit.

In the present embodiment, pixels at a position within another frame that corresponds to a position within one frame, from among frames A, B, at which the motion vector has been replaced by the 0 vector, are not employed by the interpolation processing units 409, 410 for generating pixels of an interpolation frame. Frames A, B are consecutive frames in time.

If there is a block for which "no motion vector" has been determined by the motion vector detection unit 402, the motion vector correction unit 1105 corrects the motion vector detected by the motion vector detection unit 401. Specifically, the 0 vector is substituted for motion vector V(n,L,blk2) of block blk2 of frame F(n,L) corresponding to block blk1 for which "no motion vector" has been determined in frame F(n,R). The block in frame F(n,L) corresponding to the block in frame F(n,R) is detected using disparity vector PV(n,R, blk1) in the same way as in Embodiment 1. In frame F(n,L), specifically, block blk2 at the position displaced by disparity vector PV (n, R, blk1), from the position of block blk1 in frame F(n,R), constitutes a block that corresponds to block blk1.

In case that a plurality of blocks is straddled by a region having the same size as that of a block referred to a position arrived at through displacement by the disparity vector, then the motion vectors of all the straddled blocks are set to the 0 vector.

Also, position information {al} of the blocks for which the motion vector is replaced by the 0 vector, as well as the motion vectors {V(n,L)} before replacement, are notified to the motion vector correction unit 1106.

The motion vector correction unit 1106 sends, to the motion vector correction unit 1105, position information {bl} on the blocks for which the 0 vector is substituted for the motion vector by the vector correction unit 1106, as well as the motion vectors {W(n+1,L)} before replacement. The motion vector correction unit 1105 corrects the motion vector of a block corresponding to the block denoted by position information {bl}, in frame F(n,L), on the basis of position information {bl} and the motion vectors {W(n+1,L)}. Specifically, in frame F(n,L) there is corrected the motion vector of a block at a position displaced by the motion vector W(n+1,L,blk1) from the position of one block blk1 of the blocks denoted by the position information {bl}. More specifically, a motion vector V(n,L,blk2) is modified to NI (no interpolation), wherein block blk2 denotes the block to be corrected. Blocks for which the motion vector is set thus to NI are not used by the interpolation processing units 409, 410 to generate pixels (blocks) in interpolation frames. In case that a plurality of blocks is straddled by a region having the same size as that of a block referred to a position arrived at through displacement by the motion vector, then the motion vectors of all the straddled blocks are set to NI.

The 0 vector is set (assigned) to the blocks (blocks in frame F(n,L)) for which "no motion vector" has been determined by the motion vector detection unit 401.

The motion vectors {V(n,L)} are thus corrected to yield the motion vectors {AV(n,L)}.

From among the motion vectors {AV(n,L)}, the information "corrected" is added to the motion vectors set to and replaced by the 0 vector by the motion vector correction unit 1105, and the information "not corrected" is added to other motion vectors.

Like the motion vector correction unit 1105, the motion vector correction unit 1106 sets the 0 vector to blocks for which "no motion vector" has been determined, in frame F(n+1,L). The 0 vector is substituted for the motion vectors of the blocks in frame F(n+1,L) that correspond to the blocks for which "no motion vector" has been determined in frame F(n+1,R). The motion vectors of the blocks in frame F(n+1,L) that correspond to the blocks denoted by position information {al} are modified to NI. The motion vectors {W(n+1,L)} become as a result the motion vectors {AW(n+1,L)}. Coordinate information {bl} on the blocks where the motion vector is replaced by the 0 vector, as well as the motion vectors {W(n+1,L)} before replacement, are notified to the motion vector correction unit 1105.

Like the motion vector correction unit 1105, the motion vector correction unit 1107 sets the 0 vector for the blocks for which "no motion vector" has been determined in frame F(n,R), and substitutes the 0 vector for the motion vectors of the blocks in frame F(n,R) that correspond to the blocks for which "no motion vector" has been determined in frame F(n,L). The motion vectors of the blocks in frame F(n,R) that correspond to the blocks denoted by position information {br} sent by the motion vector correction unit 1108 are modified to NI. The motion vectors {V (n,R)} become thereby the motion vectors {AV(n,R)}. Coordinate information {ar} on the blocks where the motion vector is replaced by the 0 vector, as well as motion vectors {V(n,R)} before replacement, are notified to the motion vector correction unit 1108.

Like the motion vector correction unit 1105, the motion vector correction unit 1108 sets the 0 vector to blocks for which "no motion vector" has been determined, in frame F(n+1,R), and substitutes the 0 vector for the motion vectors of the blocks in frame F(n+1,R) that correspond to the blocks for which "no motion vector" has been determined in frame F(n+1,L). The motion vectors of the blocks in frame F(n+1,R) that correspond to the blocks denoted by position information {ar} sent by the motion vector correction unit 1107 are modified to NI. The motion vectors {W(n+1,R)} become thereby the motion vectors {AW(n+1,R)}. Coordinate information {br} on the blocks where the motion vector is replaced by the 0 vector, as well as the motion vectors {W(n+1,R)} before replacement, are notified to the motion vector correction unit 1108.

Interpolation frames are generated thus in Embodiment 2 as described above.

(Detailed Explanation of the Interpolation Frame Generation Unit)

The operation of the interpolation frame generation unit 102 of Embodiment 2 is explained in detail next.

Figure 12A:
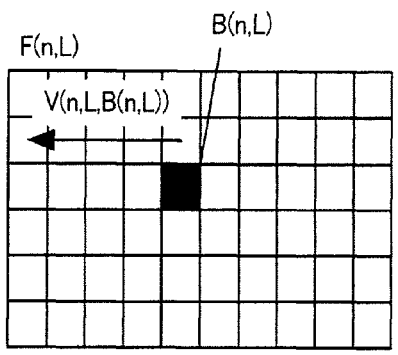
FIGS. 12A to 12F are diagrams illustrating an example of an interpolation frame generation method according to Embodiment 2.
Figure 12B:
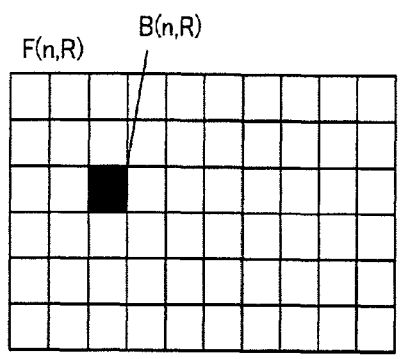
Figure 12C:
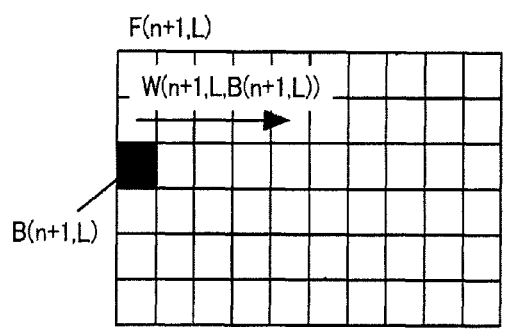
Figure 12D:
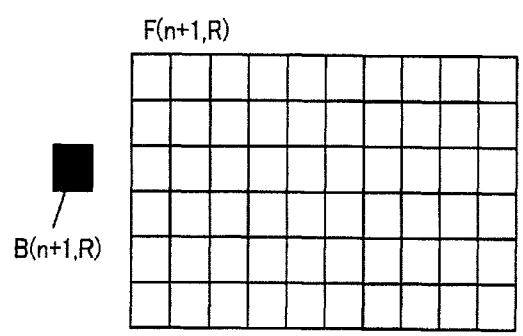
Figure 12E:
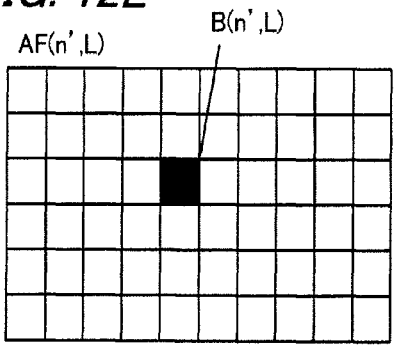
Figure 12F:
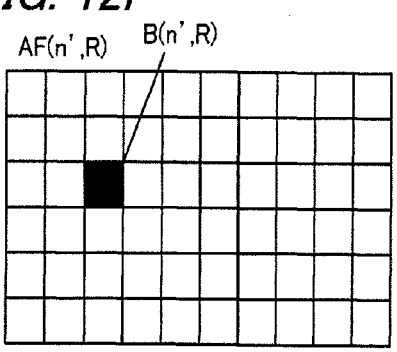

FIGS. 12A to 12F are diagrams for explaining the operation of the interpolation frame generation unit 102 in an instance of frame-out, where a black square object moves from the right to the left against a white background. FIGS. 12A to 12D represent frames of an input video image signal, and FIGS. 12E, 12F represent interpolation frames, similarly to FIGS. 7A to 7F, 8A to 8F, 9A to 9F and 10A to 10F.

An object at block B(n,L) of frame F(n,L) is searched from frame F(n+1,L). As a result, the pixel value in block B(n,L) matches the pixel value in block B(n+1,L), and there is accordingly obtained motion vector V (n,L,B(n,L)). The object in block B(n+1,L) of frame F(n+1,L) is searched from frame F(n,L). As a result, the pixel value in block B(n+1,L) matches the pixel value in block B(n,L), and there is accordingly obtained motion vector W(n+1,L,B(n+1,L)).

The object at block B(n,R) of frame F(n,R) is searched from frame F(n+1,R). As a result, there can be found no region that matches the pixel value in block B(n,R). Therefore, "no motion vector" is determined for block B(n,R). A minimum-SAD region is searched for each block in frame F(n+1,R), from frame F(n,R), and the motion vectors {W(n+1,R)} are detected. However, the black square object is absent in frame F(n+1,R), and hence the motion vectors {W(n+1,R)} include no motion vector relating to the black square object.

The disparity vectors {PV(n,L)}, PV(n,R) are detected between frames F(n,L), F(n,R). The correspondence between block B(n,R) and block B(n,L) can be grasped from the disparity vectors {PV(n,R)}.

Since "no motion vector" has been determined for block B(n,R), motion vector V (n, L, B(n,L)) of the corresponding block B(n,L) is replaced by the 0 vector. The motion vector (0 vector) after replacement is notated as AV(n,L,B(n,L)).

The position of block B(n+1,L) can be grasped, in frame F(n+1,L), through displacement, by motion vector V(n,L,B(n,L)) before replacement, from the position of block B(n,L) at which the motion vector is replaced by the 0 vector. The motion vector W(n+1,L,B(n+1,L)) of block B(n+1,L) is modified to NI (No interpolation). The motion vector (NI) after modification is notated as AW(n+1,L,B(n+1,L)).

Motion vector V (n,R, B(n,R)) is a "no motion vector", and hence AV(n,R, B(n,R))=0 vector.

Motion vector AV(n,L,B(n,L)) is the 0 vector upon generation of interpolation frame AF(n',L), and hence the object is generated at a block B(n',L) at the same position as that of block B(n,L). Since motion vector AW(n+1,L,B(n+1,L)) is NI (No interpolation), block B(n+1,L) is not used to generate interpolation frame AF(n',L).

Motion vector AV(n,R, B(n,R)) is the 0 vector upon generation of interpolation frame AF(n',R), and hence the object is generated at a block B(n',R) at the same position as that of block B(n,R).

In the interpolation frame, blocks B(n,L), B(n,R) and another block (white background block) are generated in some cases overlapping each other. However, the motion vectors of these blocks are "corrected" motion vectors. Therefore, the data (pixel value) of the black square object is given priority, without being subjected to averaging.

Generating interpolation frames in the above-described way allows generating a black square object at blocks B(n',L), B(n',R) at which correct disparity is maintained, and allows generating interpolation frames at which the stereoscopic sensation is not lost.

Figure 13A:
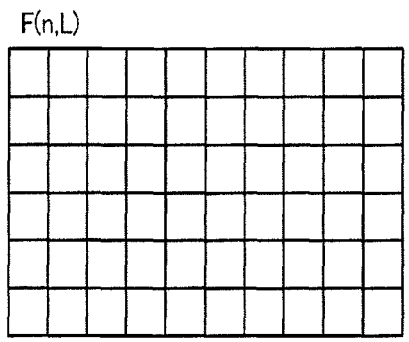
FIGS. 13A to 13F are diagrams illustrating an example of an interpolation frame generation method according to Embodiment 2.
Figure 13B:
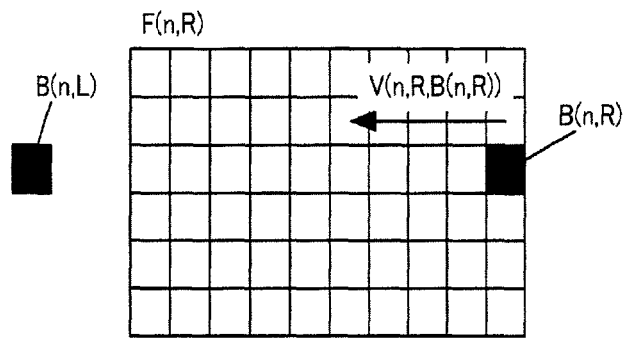
Figure 13C:
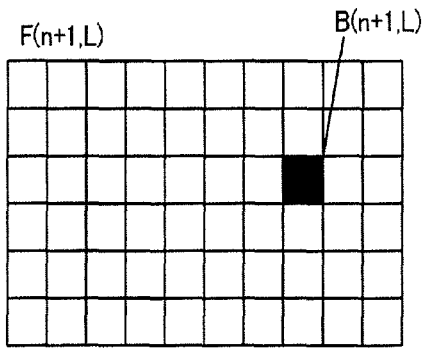
Figure 13D:
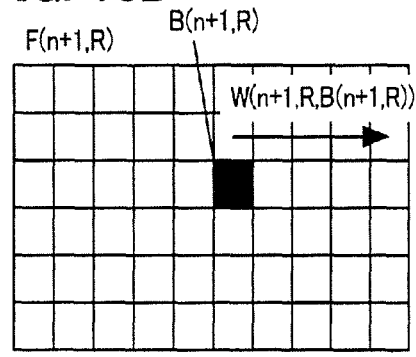
Figure 13E:
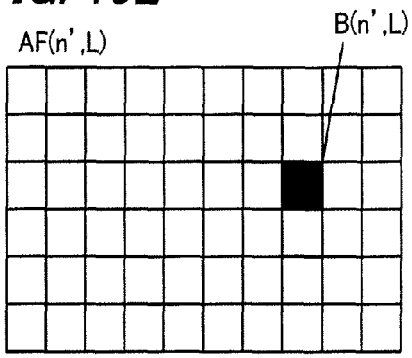
Figure 13F:
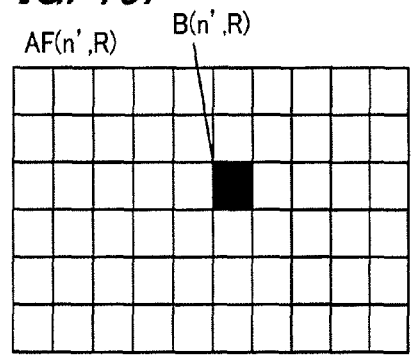

The operation of the interpolation frame generation unit 102 in a case of frame-in of a black square object moving from the right to the left on a white background will be explained next with reference to FIGS. 13A to 13F. FIGS. 13A to 13D represent frames of an input video image signal, and FIGS. 13E, 13F represent interpolation frames, similarly to FIGS. 7A to 7F, 8A to 8F, 9A to 9F, 10A to 10F, 12A to 12F.

The object at block B(n,R) of frame F(n,R) is searched from frame F(n+1,R). As a result, the pixel value in block B(n,R) matches the pixel value in block B(n+1,R), and there is accordingly obtained motion vector V (n,R,B(n,R)). The object in block B(n+1,R) of frame F(n+1,R) is searched from frame F(n,R). As a result, the pixel value in block B(n+1,R) matches the pixel value in block B(n,R), and there is accordingly obtained motion vector W(n+1, R, B(n+1,R)).

A minimum-SAD region is searched for each block in frame F(n,L), from frame F(n+1,L), and the motion vectors {V(n,L)} are detected. However, the black square object is absent in frame F(n,L), and hence the motion vectors {V(n, L)} include no motion vector relating to the black square object. The object in block B(n+1,L) of frame F(n+1,L) is searched from frame F(n,L). As a result, there can be found no region that matches the pixel value in block B(n+1,L). Therefore "no motion vector" is determined for block B(n+1,L).

The disparity vectors {PV (n+1,L), PV (n+1,R)} are detected between frames F(n+1,L), F(n+1,R). The correspondence between block B(n+1,L) and block B(n+1,R) can be grasped from the disparity vectors {PV(n+1,L)}.

Since "no motion vector" has been determined for block B(n+1,L), the motion vector W(n+1, R, B(n+1,R)) of the corresponding block B(n+1, R) is replaced by the 0 vector. The motion vector (0 vector) after replacement is notated as AW(n+1, R, B(n+1,R)).

The position of the block B(n,R) can be grasped, in frame F(n,R), through displacement, by the motion vector W(n+1, R, B(n+1,R)) before replacement, from the position of the block B(n+1,R) at which the motion vector is replaced by the 0 vector. Motion vector V (n,R, B(n,R)) of block B(n,R) is modified to NI (No interpolation). The motion vector (NI) after modification is notated as AV(n,R, B(n,R)).

The motion vector W(n+1,L,B(n+1,L)) is a "no motion vector", and hence AW(n+1,L,B(n+1,L))=0 vector.

The motion vector AW(n+1,L,B(n+1,L)) is the 0 vector upon generation of interpolation frame AF(n', L), and hence the object is generated at a block B(n',L) at the same position as that of block B(n+1,L).

The motion vector AW(n+1, R, B(n+1,R)) is the 0 vector upon generation of interpolation frame AF(n',R), and hence the object is generated at a block B(n',R) at the same position as that of block B(n+1,R). Since motion vector AV(n,R, B(n, R)) is NI (No interpolation), block B(n,R) is not used to generate interpolation frame AF(n',R).

In the interpolation frame, blocks B(n+1,L), B(n+1,R) are generated in some cases overlapping another block (white background block). However, the motion vectors of these blocks are "corrected" motion vectors, and hence the data (pixel value) of the black square object is given priority, without being subjected to averaging.

Generating interpolation frames in the above-described way allows generating a black square object at blocks B(n',L), B(n',R) at which correct disparity is maintained, and allows generating interpolation frames at which the stereoscopic sensation is not lost.

In the present embodiment, thus, if a non-detection position of a motion vector is present in a frame for one eye, as described above, then the 0 vector is set for the non-detection position. In the other frame, the 0 vector is substituted for the motion vector detected at a corresponding position that corresponds to the non-detection position. Correct disparity can be maintained by generating an interpolation frame using the motion vector thus set. In the present embodiment, specifically, interpolation frames in which the stereoscopic sensation is not lost can be generated, even in a case where a motion vector cannot be detected in a frame for one eye, upon frame rate conversion of stereoscopic video.

In the present embodiment, pixels at positions in a frame for one eye that correspond to positions in another frame for the one eye at which the motion vector is replaced by the 0 vector, are not used for generating pixels in interpolation frames. As a result, this allows preventing a same subject from being generated at dissimilar positions in one interpolation frame, and allows further preserving the stereoscopic sensation.

Embodiments 1, 2 have been explained based on an instance where the inputted video image signal is a stereoscopic video signal of frame sequential scheme. However, the present invention is not limited to a frame sequential scheme. For instance, the invention can be realized also in a case where a video image for the right eye and a video image for the left eye are inputted independently, so long as the interpolation frames are generated after storage of both video image signals in a frame memory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-093012, filed on Apr. 14, 2010, which is hereby incorporated by reference herein in its entirety.

What is claimed is:

1. An image processing apparatus that generates interpolation frames between respective frames of a first video image and a second video image that constitute stereoscopic video, the image processing apparatus comprising:
   a motion vector detection unit that detects a motion vector between frames of each video image using two temporally consecutive frames that constitute the first video image and two temporally consecutive frames that constitute the second video image;
   a disparity vector detection unit that, using a frame that constitutes the first video image and a frame that constitutes the second video image, detects a disparity vector that represents disparity between the two frames;
   a correction unit that, when there exists a non-detection position at which no motion vector is detected in a frame of one video image from among the first video image and the second video image, performs correction by detecting a corresponding position included in a frame of the other video image that corresponds to the non-detection position using the disparity vector, and setting a motion vector of the frame of the other video image at the corresponding position, to the non-detection position; and
   an interpolation frame generation unit that generates respective interpolation frames of the first video image and the second video image using the motion vector after correction,
   wherein the interpolation frame generation unit maps each pixel in a frame to a position in an interpolation frame, on a basis of a motion vector; generates thereafter each pixel of the interpolation frame using the pixels mapped to each position in the interpolation frame; and generates pixels at the position of the interpolation frame to which a plurality of pixels are mapped, using only pixels at a position for which a motion vector detection result has been corrected by the correction unit, from among the plurality of pixels.

2. The image processing apparatus according to claim 1, wherein, the motion vector detection unit detects, using two consecutive frames A and B, a vector from a position in frame A up to a corresponding position in frame B, and a vector from a position in frame A up to a corresponding position in frame A, as motion vectors for the first video image and the second video image, respectively.

3. The image processing apparatus according to claim 1, wherein, the interpolation frame generation unit generates pixels at the position of the interpolation frame to which a plurality of pixels, which includes a pixel at a position for which a motion vector detection result has been corrected by the correction unit and a pixel at a position for which a motion vector detection result has not been corrected by the correction unit, are mapped, using only pixels at a position for which a motion vector detection result has been corrected by the correction unit, from among the plurality of pixels.

4. The image processing apparatus according to claim 1, wherein, the interpolation frame generation unit generates pixels at the position of the interpolation frame to which a plurality of pixels, which does not include any pixels at a position for which a motion vector detection result has been corrected by the correction unit, are mapped, by calculating an average value of pixel values of the plurality of pixels.

5. The image processing apparatus according to claim 1, wherein, the interpolation frame generation unit generates pixels at the position of the interpolation frame to which a plurality of pixels, which includes a plurality of pixels at a position for which a motion vector detection result has been corrected by the correction unit, are mapped, by calculating an average value of pixel values of the plurality of pixels at a position for which a motion vector detection result has been corrected.

6. The image processing apparatus according to claim 1, wherein, the interpolation frame generation unit generates pixels at the position of the interpolation frame to which no pixel is mapped, by calculating an average value of pixel values of pixels at the same position of preceding and succeeding frames as the position of the interpolation frame.

7. An image processing apparatus that generates interpolation frames between respective frames of a first video image and a second video image that constitutes stereoscopic video, the image processing apparatus comprising:
a motion vector detection unit that detects a motion vector between frames of each video image using two temporally consecutive frames that constitute the first video image and two temporally consecutive frames that constitute the second video image;
a disparity vector detection unit that, using a frame that constitutes the first video image and a frame that constitutes the second video image, detects a disparity vector that represents disparity between the two frames;
a correction unit that, when there exists a non-detection position at which no motion vector is detected in a frame of one video image from among the first video image and the second video image, performs correction by setting a zero-magnitude motion vector to the non-detection position, detecting a corresponding position included in a frame of the other video image that corresponds to the non-detection position using the disparity vector, and replacing a motion vector detected at the corresponding position by the zero-magnitude vector;
an interpolation frame generation unit that generates respective interpolation frames of the first video image and the second video image using the motion vector after correction.

8. The image processing apparatus according to claim 7, wherein the interpolation frame generation unit maps each pixel in a frame to a position in an interpolation frame, on a basis of a motion vector; generates thereafter each pixel of the interpolation frame using the pixels mapped to each position in the interpolation frame; and
generates pixels at the position of the interpolation frame to which a plurality of pixels are mapped, using only pixels at a position for which a motion vector detection result has been corrected by the correction unit, from among the plurality of pixels.

9. The image processing apparatus according to claim 7, wherein, the interpolation frame generation unit does not employ, for generating pixels of the interpolation frame, pixels at a position within one frame that corresponds to a position within another frame, from among temporary consecutive frames, the motion vector at the position within the another frame having been replaced by the zero-magnitude vector.

10. The image processing apparatus according to claim 9, wherein the position within the one frame that corresponds to the position within the another frame is a position displaced by the motion vector before replacement by the zero-magnitude vector from the position within the another frame.

11. The image processing apparatus according to claim 7, wherein, the interpolation frame generation unit generates pixels at the position of the interpolation frame to which a plurality of pixels, which includes a pixel at a position for which a motion vector detection result has been corrected by the correction unit and a pixel at a position for which a motion vector detection result has not been corrected by the correction unit, are mapped, using only pixels at a position for which a motion vector detection result has been corrected by the correction unit, from among the plurality of pixels.

12. The image processing apparatus according to claim 7, wherein, the interpolation frame generation unit generates pixels at the position of the interpolation frame to which a plurality of pixels, which does not include any pixels at a position for which a motion vector detection result has been corrected by the correction unit, are mapped, by calculating an average value of pixel values of the plurality of pixels.

13. An image processing method, being a method executed by an image processing apparatus that generates interpolation frames between respective frames of a first video image and a second video image that constitute stereoscopic video, the method comprising the steps of:
detecting a motion vector between frames of each video image using two temporally consecutive frames that constitute the first video image and two temporally consecutive frames that constitute the second video image;
detecting, using a frame that constitutes the first video image and a frame that constitutes the second video image, a disparity vector that represents disparity between the two frames;
when there exists a non-detection position at which no motion vector is detected in a frame of one video image from among the first video image and the second video image, performing correction by detecting a corresponding position included in a frame of the other video image that corresponds to the non-detection position using the disparity vector, and setting a motion vector of the frame of the other video image at the corresponding position, to the non-detection position; and generating respective interpolation frames of the first video image and the second video image using the motion vector after correction, wherein, in the generating interpolation frames, each pixel in a frame is mapped to a position in an interpolation frame, on a basis of a motion vector; each pixel of the interpolation frame is thereafter generated using the pixels mapped to each position in the interpolation frame; and pixels at the position of the interpolation frame to which a plurality of pixels are mapped are generated, using only pixels at a position for which a motion vector detection result has been corrected by the correction, from among the plurality of pixels.

14. An image processing method, being a method executed by an image processing apparatus that generates interpolation frames between respective frames of a first video image and a second video image that constitute stereoscopic video, the method comprising the steps of:

detecting a motion vector between frames of each video image using two temporally consecutive frames that constitute the first video image and two temporally consecutive frames that constitute the second video image;

detecting, using a frame that constitutes the first video image and a frame that constitutes the second video image, a disparity vector that represents disparity between the two frames;

when there exists a non-detection position at which no motion vector is detected in a frame of one video image from among the first video image and the second video image, performing correction by setting a zero-magnitude motion vector to the non-detection position, detecting a corresponding position included in a frame of the other video image that corresponds to the non-detection position using the disparity vector, and replacing a motion vector detected at the corresponding position by the zero-magnitude vector; and generating respective interpolation frames of the first video image and the second video image using the motion vector after correction.

* * * * *